United States Patent
Mahowald et al.

(10) Patent No.: US 8,860,653 B2
(45) Date of Patent: Oct. 14, 2014

(54) AMBIENT LIGHT SENSING TECHNIQUE

(75) Inventors: Peter H. Mahowald, Los Altos, CA (US); Ulrich T. Barnhoefer, Cupertino, CA (US)

(73) Assignee: Apple Inc., Cupertino, CA (US)

(*) Notice: Subject to any disclaimer, the term of this patent is extended or adjusted under 35 U.S.C. 154(b) by 1030 days.

(21) Appl. No.: 12/873,950

(22) Filed: Sep. 1, 2010

(65) Prior Publication Data

US 2012/0050307 A1   Mar. 1, 2012

(51) Int. Cl.
*G09G 3/36* (2006.01)
*G09G 3/20* (2006.01)
*G09G 3/34* (2006.01)

(52) U.S. Cl.
CPC ..... *H05N 37/0218* (2013.01); *G09G 2360/144* (2013.01); *G09G 2320/0666* (2013.01); *G09G 3/20* (2013.01); *G09G 3/3413* (2013.01); *Y02B 20/46* (2013.01); *G09G 2320/0626* (2013.01)
USPC ............. 345/102; 345/207; 345/589; 349/61; 349/62; 349/63; 348/223.1; 348/742

(58) Field of Classification Search
USPC ........................ 345/102; 349/61–97
See application file for complete search history.

(56) References Cited

U.S. PATENT DOCUMENTS

| 7,292,875 | B2 | 11/2007 | Chan et al. | |
|---|---|---|---|---|
| 7,538,406 | B2 | 5/2009 | Lin et al. | |
| 2003/0227577 | A1* | 12/2003 | Allen et al. | 348/742 |
| 2006/0132424 | A1* | 6/2006 | Foo et al. | 345/102 |
| 2006/0192749 | A1* | 8/2006 | Lowles et al. | 345/102 |
| 2008/0200869 | A1* | 8/2008 | Bedingfield | 604/29 |
| 2008/0303918 | A1* | 12/2008 | Keithley | 348/223.1 |
| 2009/0091560 | A1 | 4/2009 | Ferguson | |
| 2010/0128049 | A1* | 5/2010 | Georgiev et al. | 345/589 |
| 2010/0159980 | A1* | 6/2010 | Mikan et al. | 455/556.1 |
| 2011/0043503 | A1* | 2/2011 | Hadwen | 345/207 |
| 2011/0175925 | A1* | 7/2011 | Kane et al. | 345/589 |

FOREIGN PATENT DOCUMENTS

| WO | 2008073783 | 6/2008 |
|---|---|---|
| WO | 2009093746 | 7/2009 |

* cited by examiner

*Primary Examiner* — Gerald Johnson
(74) *Attorney, Agent, or Firm* — Fletcher Yoder PC

(57) ABSTRACT

A method for controlling characteristics of an electronic device based on ambient light levels is provided. In one embodiment, the method includes receiving light at an ambient light sensor of a device and measuring components, such as color components, of the visible light. The component levels may be weighted differently by factors that vary based on the intensity of the light received by the ambient light sensor. Also, the brightness level of a light source in the device or color output of the device may be controlled based on the weighted component levels. Additional methods, systems, and devices relating to control of an electronic device based on sensed ambient light are also disclosed.

21 Claims, 7 Drawing Sheets

AMBIENT LIGHT SENSING TECHNIQUE

BACKGROUND

1. Technological Field

This relates generally to ambient light sensors and devices employing such sensors.

2. Description of the Related Art

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many electronic devices include display screens to provide visual output. As may be appreciated, such display screens are used in a wide variety of devices, including desktop computer systems, notebook computers, handheld computing devices, televisions, cellular phones, and portable media players, to name only a few examples. Many of these electronic devices also include backlights that illuminate the display screens. Ambient light sensors may be included in electronic devices to enable ambient light levels to be sensed, and to control the brightness of a display backlight based on the ambient light levels. In some instances, such control may facilitate power conservation and an improved user experience (e.g., by making the display easier to read at different ambient light levels).

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to ambient light sensors and to altering visual output characteristics of electronic devices based on sensed ambient light conditions. In one embodiment, an electronic device measures ambient illumination levels and adjusts the spectral response of an ambient light sensor based on the measured ambient illumination levels. In some instances, the spectral response of the ambient light sensor may be adjusted to more closely simulate the spectral response of a human eye, which has a response that varies depending on ambient illumination levels. The output from the ambient light sensor may be used for controlling various aspects of the device, such as a display backlight brightness level, a keyboard backlight brightness level, or the colors output via a display. Additionally, one embodiment may include a device having multiple light sensors for detecting light at different frequencies and for controlling aspects of the device based on the color content of the ambient light.

Various refinements of the features noted above may exist in relation to the presently disclosed embodiments. Additional features may also be incorporated in these various embodiments as well. These refinements and additional features may exist individually or in any combination. For instance, various features discussed below in relation to one or more of the illustrated embodiments may be incorporated into any of the above-described embodiments alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Advantages of the present disclosure may become apparent upon reading the following detailed description and upon reference to the drawings in which.

DETAILED DESCRIPTION OF SPECIFIC EMBODIMENTS

One or more specific embodiments will be described below. These described embodiments are provided only by way of example, and do not limit the scope of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments described below, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an embodiment," "some embodiments," and the like are not intended to be interpreted as excluding the existence of additional embodiments that also incorporate the disclosed features.

Certain embodiments of the present disclosure are generally directed to varying visual characteristics of an electronic device based on sensed ambient light levels. In some embodiments, an ambient light sensor has a spectral response that varies based on the luminance level of received ambient light. For instance, an ambient light sensor may operate in accordance with a first spectral response function when ambient light is within a photopic range, but in accordance with a second spectral response function when ambient light is in a sub-photopic range. Such variation of the spectral response of the ambient light sensor may provide increased accuracy in controlling one or more backlights of the device. In other embodiments, colors in image data output by a display may be adjusted based on the ambient light level to compensate for dark adaptation and to improve image contrast. With these foregoing features in mind, a general description of electronic devices including a display that may use the presently disclosed technique is provided below.

Figure 1:
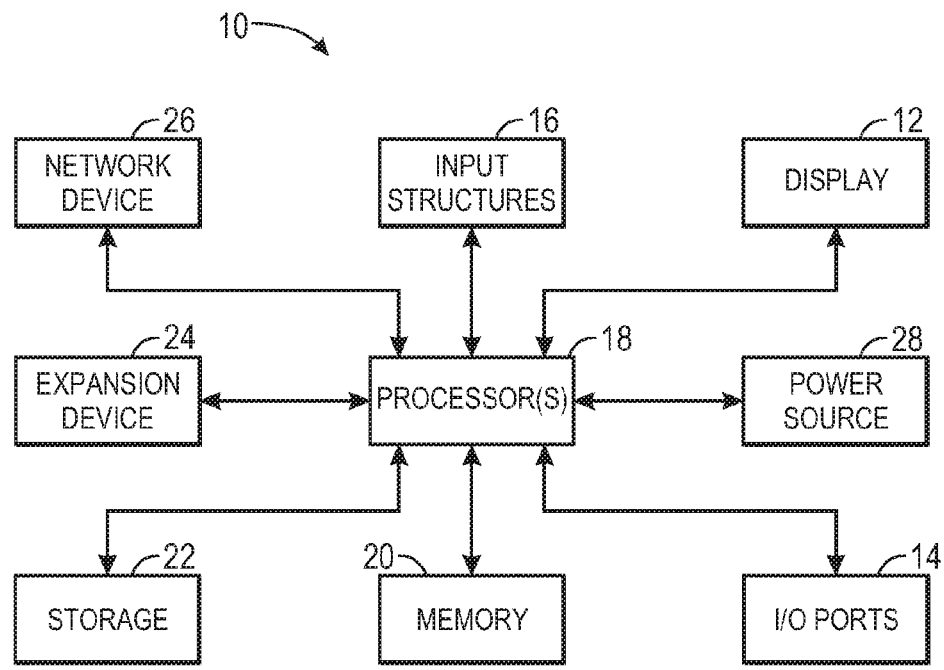
FIG. 1 is a block diagram of exemplary components of an electronic device, in accordance with aspects of the present disclosure.

As may be appreciated, electronic devices may include various internal and/or external components which contribute to the function of the device. For instance, FIG. 1 is a block diagram illustrating components that may be present in one such electronic device 10. Those of ordinary skill in the art will appreciate that the various functional blocks shown in FIG. 1 may include hardware elements (including circuitry), software elements (including computer code stored on a computer-readable medium, such as a hard drive or system memory), or a combination of both hardware and software elements. FIG. 1 is only one example of a particular implementation and is merely intended to illustrate the types of components that may be present in the electronic device 10. For example, in the presently illustrated embodiment, these components may include a display 12, input/output (I/O) ports 14, input structures 16, one or more processors 18, one or more memory devices 20, non-volatile storage 22, expansion device 24, networking device 26, and power source 28.

The display 12 may be used to display various images generated by the electronic device 10. The display 12 may be any suitable display, such as a liquid crystal display (LCD) or an organic light-emitting diode (OLED) display. Additionally, in certain embodiments of the electronic device 10, the display 12 may be provided in conjunction with a touch-sensitive element, such as a touchscreen, that may be used as part of the control interface for the device 10.

The I/O ports 14 may include ports configured to connect to a variety of external devices, such as a power source, headset or headphones, or other electronic devices (such as handheld devices and/or computers, printers, projectors, external displays, modems, docking stations, and so forth). The I/O ports 14 may support any interface type, such as a universal serial bus (USB) port, a video port, a serial connection port, an IEEE-1394 port, an Ethernet or modem port, and/or an AC/DC power connection port.

The input structures 16 may include the various devices, circuitry, and pathways by which user input or feedback is provided to processor(s) 18. Such input structures 16 may be configured to control a function of an electronic device 10, applications running on the device 10, and/or any interfaces or devices connected to or used by device 10. For example, input structures 16 may allow a user to navigate a displayed user interface or application interface. Non-limiting examples of input structures 16 include buttons, sliders, switches, control pads, keys, knobs, scroll wheels, keyboards, mice, touchpads, and so forth. Additionally, in certain embodiments, one or more input structures 16 may be provided together with display 12, such an in the case of a touchscreen, in which a touch sensitive mechanism is provided in conjunction with display 12.

Processors 18 may provide the processing capability to execute the operating system, programs, user and application interfaces, and any other functions of the electronic device 10. The processors 18 may include one or more microprocessors, such as one or more "general-purpose" microprocessors, one or more special-purpose microprocessors or ASICS, or some combination of such processing components. For example, the processors 18 may include one or more reduced instruction set (RISC) processors, as well as graphics processors, video processors, audio processors, and the like. As will be appreciated, the processors 18 may be communicatively coupled to one or more data buses or chipsets for transferring data and instructions between various components of the electronic device 10.

Programs or instructions executed by processor(s) 18 may be stored in any suitable manufacture that includes one or more tangible, non-transitory, computer-readable media at least collectively storing the executed instructions or routines, such as, but not limited to, the memory devices and storage devices described below. Also, these programs (e.g., an operating system) encoded on such a computer program product may include instructions executable by the processors 18 to enable device 10 to provide various functionalities, including those described herein.

The instructions or data to be processed by the one or more processors 18 may be stored in a computer-readable medium, such as a memory 20. The memory 20 may include a volatile memory, such as random access memory (RAM), and/or a non-volatile memory, such as read-only memory (ROM). The memory 20 may store a variety of information and may be used for various purposes. For example, the memory 20 may store firmware for electronic device 10 (such as basic input/output system (BIOS)), an operating system, and various other programs, applications, or routines that may be executed on electronic device 10. In addition, the memory 20 may be used for buffering or caching during operation of the electronic device 10.

The components of the device 10 may further include other forms of computer-readable media, such as non-volatile storage 22 for persistent storage of data and/or instructions. Non-volatile storage 22 may include, for example, flash memory, a hard drive, or any other optical, magnetic, or solid-state storage media. Non-volatile storage 22 may be used to store firmware, data files, software programs, wireless connection information, and any other suitable data.

The embodiment illustrated in FIG. 1 may also include one or more card or expansion slots. The card slots may be configured to receive one or more expansion cards or devices 24 that may be used to add functionality, such as additional memory, I/O functionality, or networking capability, to electronic device 10. Such expansion cards 24 may connect to device 10 through any type of suitable connector, and may be accessed internally or external to the housing of electronic device 10. For example, in one embodiment, expansion cards 24 may include a flash memory card, such as a SecureDigital (SD) card, mini- or microSD, CompactFlash card, Multimedia card (MMC), or the like. Additionally, expansion cards 24 may include one or more processor(s) 18 of the device 10, such as a video graphics card having a GPU for facilitating graphical rendering by device 10.

The components depicted in FIG. 1 also include a network device 26, such as a network controller or a network interface card (NIC). In one embodiment, the network device 26 may be a wireless NIC providing wireless connectivity over any 802.11 standard or any other suitable wireless networking standard. The device 10 may also include a power source 28. In one embodiment, the power source 28 may include one or more batteries, such as a lithium-ion polymer battery or other type of suitable battery. Additionally, the power source 28 may include AC power, such as provided by an electrical outlet, and electronic device 10 may be connected to the power source 28 via a power adapter. This power adapter may also be used to recharge one or more batteries of device 10.

Figure 2:
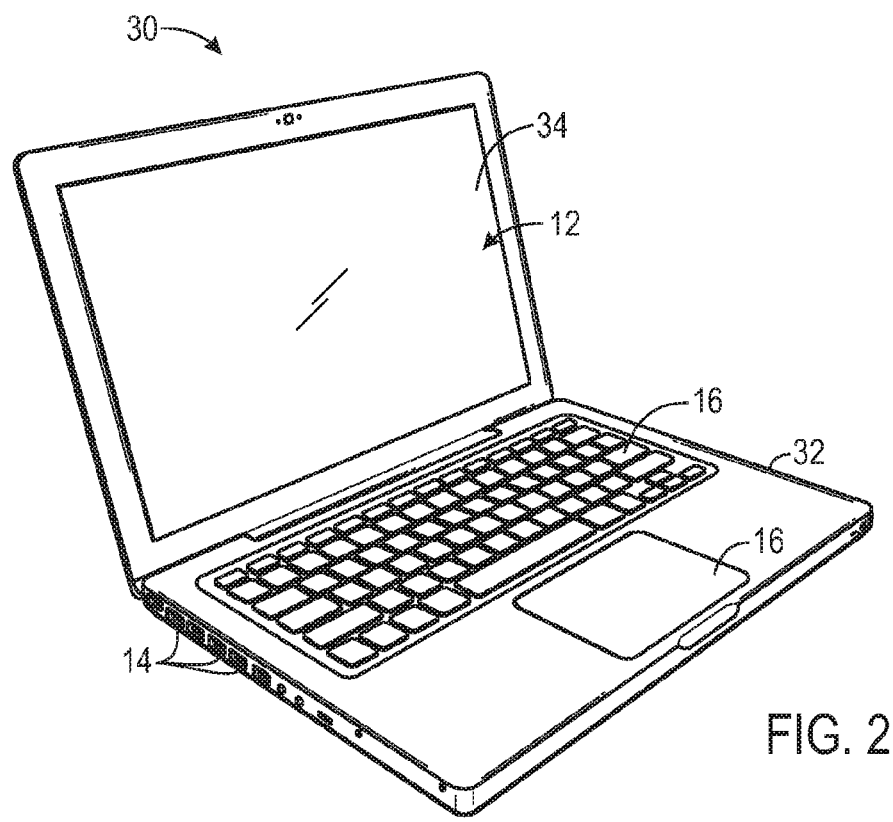
FIG. 2 is a perspective view of a computer in accordance with aspects of the present disclosure.

The electronic device 10 may take the form of a computer system or some other type of electronic device. Such computers may include computers that are generally portable (such as laptop, notebook, tablet, and handheld computers), as well as computers that are generally used in one place (such as conventional desktop computers, workstations and/or servers). In certain embodiments, electronic device 10 in the form of a computer may include a model of a MacBook®, MacBook® Pro, MacBook Air®, iMac®, Mac® mini, or Mac Pro® available from Apple Inc. of Cupertino, Calif. By way of example, an electronic device 10 in the form of a laptop computer 30 is illustrated in FIG. 2 in accordance with one embodiment. The depicted computer 30 includes a housing 32, a display 12 (e.g., in the form of an LCD 34 or some other suitable display), I/O ports 14, and input structures 16.

The display 12 may be integrated with the computer 30 (e.g., such as the display of the depicted laptop computer) or may be a standalone display that interfaces with the computer 30 using one of the I/O ports 14, such as via a DisplayPort, Digital Visual Interface (DVI), High-Definition Multimedia Interface (HDMI), or analog (D-sub) interface. For instance, in certain embodiments, such a standalone display 12 may be a model of an Apple Cinema Display®, available from Apple Inc.

Figure 3:
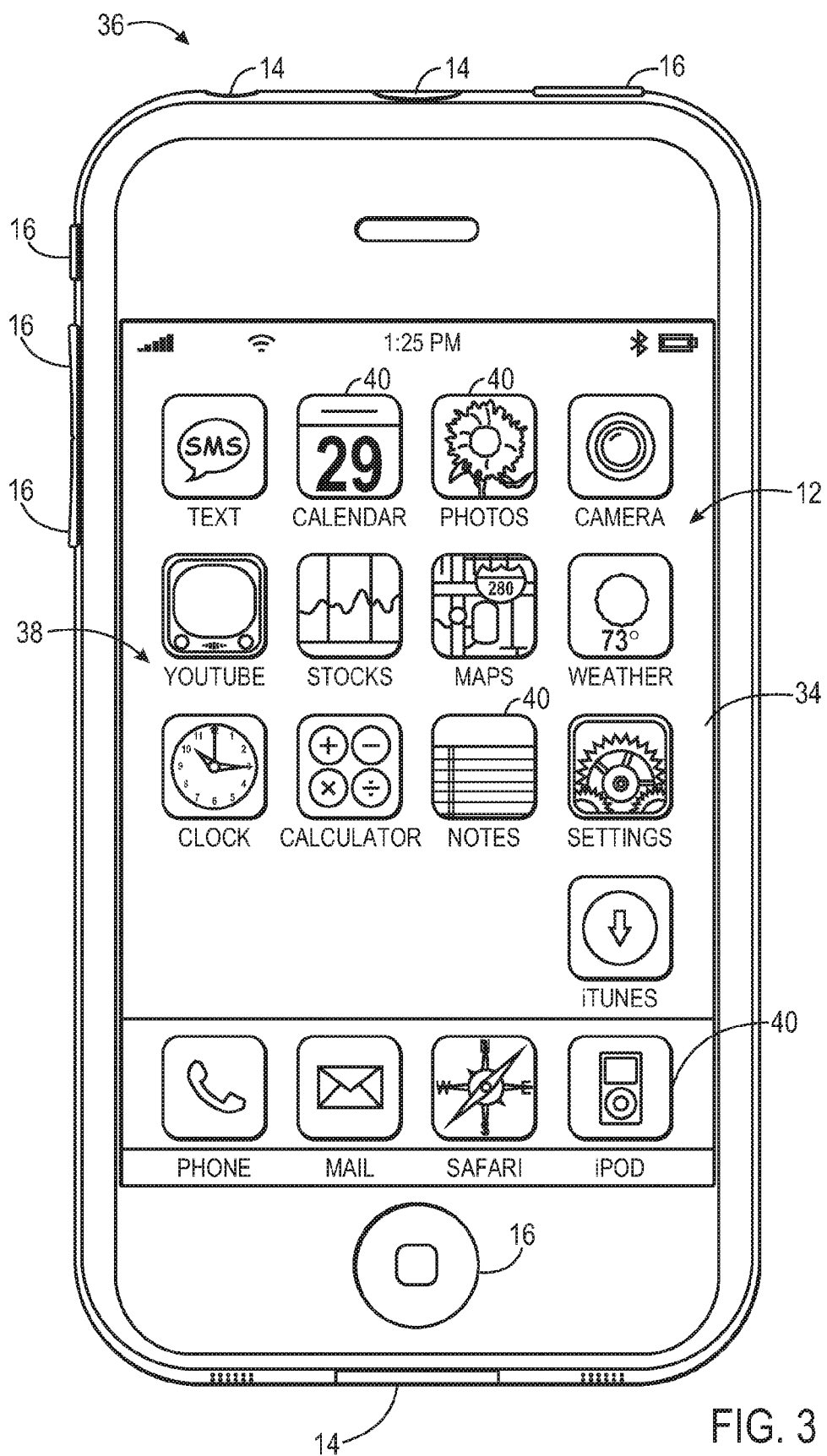
FIG. 3 is a perspective view of a handheld electronic device in accordance with aspects of the present disclosure.

Although an electronic device 10 is generally depicted in the context of a computer in FIG. 2, an electronic device 10 may also take the form of other types of electronic devices. In some embodiments, various electronic devices 10 may include mobile telephones, media players, personal data organizers, handheld game platforms, cameras, and combinations of such devices. For instance, as generally depicted in FIG. 3, the device 10 may be provided in the form of handheld electronic device 36 that includes various functionalities (such as the ability to take pictures, make telephone calls, access the Internet, communicate via email, record audio and video, listen to music, play games, and connect to wireless networks). By way of further example, handheld device 36 may be a model of an iPhone®, iPod®, or iPad® available from Apple Inc. Other electronic device embodiments may include, among other things, electronic devices in vehicles (e.g., car stereo units, DVD or other media playback units, or navigation units) and medical or other related healthcare devices.

Handheld device 36 of the presently illustrated embodiment includes a display 12, which may be in the form of an LCD 34. The LCD 34 may display various images generated by the handheld device 36, such as a graphical user interface (GUI) 38 having one or more icons 40. The device 36 may also include various I/O ports 14 to facilitate interaction with other devices, and user input structures 16 to facilitate interaction with a user.

Figure 4:
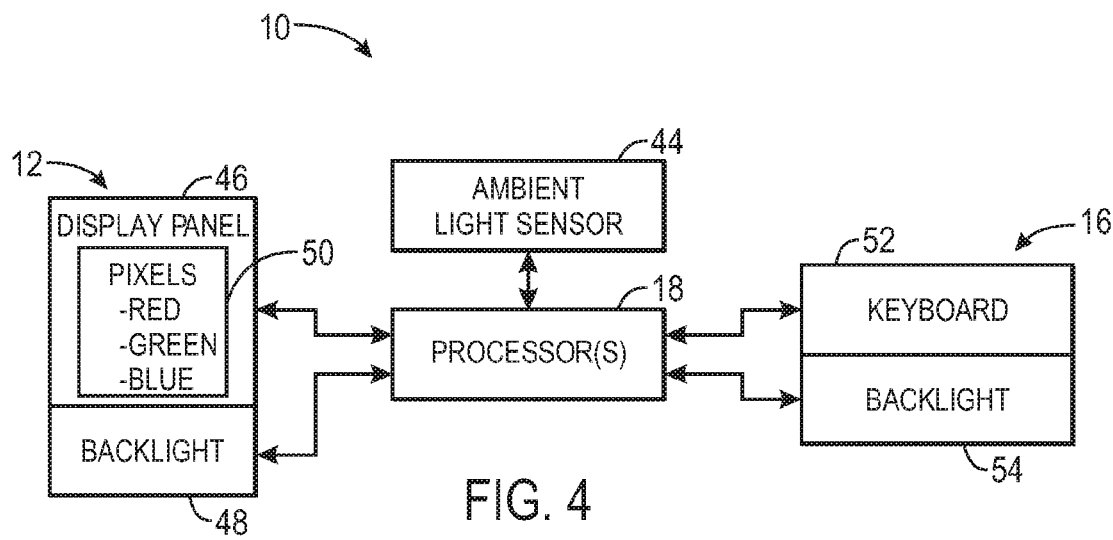
FIG. 4 is a block diagram illustrating additional components of an electronic device, including an ambient light sensor, in accordance with aspects of the present disclosure.

As generally depicted in FIG. 4, the electronic device 10 may also include an ambient light sensor 44 for measuring ambient light levels in an environment surrounding the electronic device 10. These measured ambient light levels may then be used to control various aspects of the electronic device 10. For example, the display 12 of the device 10 may include a display panel 46 and a backlight 48, and a processor 18 (or some other controller) may control the brightness of the backlight 48 based on the measured ambient light levels detected by the ambient light sensor 44. Additionally, in some embodiments, pixels 50 of the display panel 46 may be driven differently depending on the measured ambient light levels. For example, and as discussed in greater detail below, the display panel 46 may include red, green, and blue pixels 50, and drive signals to the various pixels may be increased or decreased to emphasize or deemphasize particular colors. Also, the device 10 may include an input device 16, such as a keyboard 52, illuminated by a backlight 54 that may also be controlled based on the measured ambient light levels. As used herein, the term "keyboard" refers to one or more keys that facilitate user interaction with a device. Thus, the term "keyboard" is presently used to refer to full keyboards (e.g., a QWERTY keyboard), as well as a smaller number of keys in other forms (e.g., a keypad, or one or more keys in another arrangement).

Figure 5:
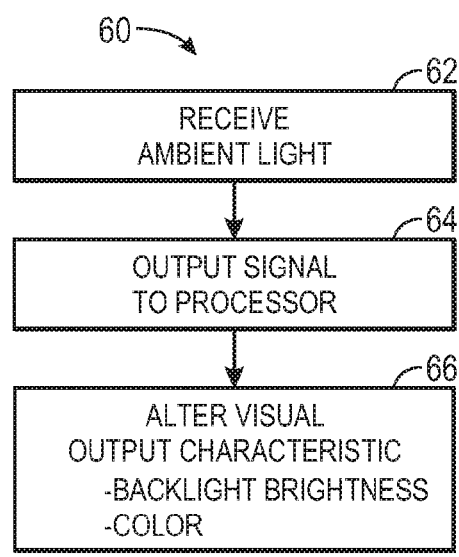
FIG. 5 is a flowchart representing a process for altering visual output characteristics of an electronic device based on ambient light in accordance with aspects of the present disclosure.

Visual output characteristics of the device 10 may be controlled based on ambient light levels in accordance with flow-chart 60, which is provided in FIG. 5 in accordance with one embodiment. Particularly, ambient light may be received by the ambient light sensor 44 at block 62. The ambient light sensor 44 may output a signal representative of the received ambient light to a processor at block 64. In some embodiments, the output signal may be provided by the ambient light sensor 44 in a digital form. But in other embodiments the ambient light sensor 44 may provide an analog output, which may be converted to a digital signal before use by the processor. At block 66, the processor may effect the alteration one or more visual output characteristics of the device 10 based on the measured ambient light levels (as represented by the output signals from the ambient light sensor 44). As noted above, and described in more detail below, non-limiting examples of visual output characteristics that may be altered in view of the measured ambient light levels include display backlight intensity, display color output, and keyboard backlight intensity.

Figure 6:
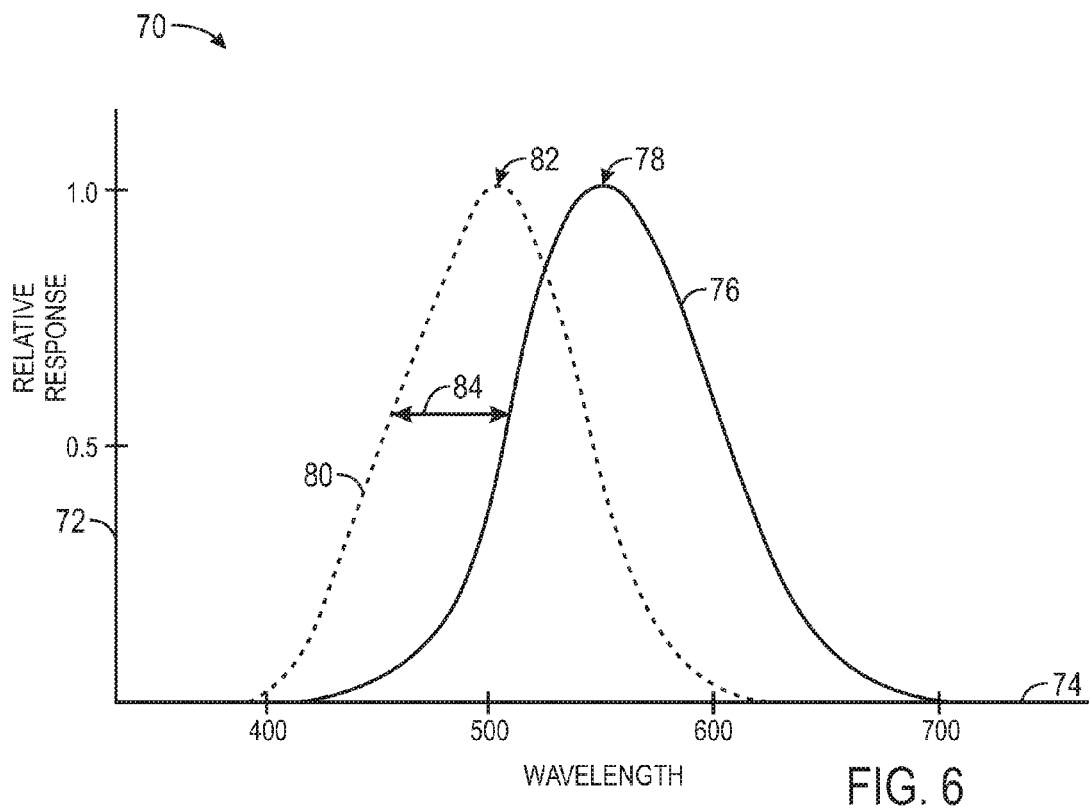
FIG. 6 is a graph indicative of a varying spectral response of an ambient light sensor in accordance with aspects of the present disclosure.

In some embodiments, the ambient light sensor 44 exhibits a spectral response that varies depending on ambient light intensity, as generally depicted by graph 70 provided in accordance with one embodiment in FIG. 6. Particularly, graph 70 provides an example of the spectral response of the ambient light sensor 44 and depicts the relative response of the ambient light sensor 44 (depicted along vertical axis 72) as a function of the wavelength of received ambient light (depicted along horizontal axis 74). In one embodiment, curve 76 generally represents the spectral response of the ambient light sensor 44 when ambient light levels are within a photopic luminance range. More specifically, in the presently illustrated embodiment, the spectral response of the ambient light sensor 44 in the photopic range approximates the spectral response of an ordinary human eye in photopic lighting conditions, with peak response or sensitivity (represented by reference numeral 78) at a wavelength of approximately 550 nm (e.g., 555 nm).

But the ordinary human eye exhibits a different spectral response in low-light conditions below the photopic range (e.g., within the scotopic or mesopic ranges). As may be appreciated, this variation in spectral response of the human eye is attributable to human physiology, in which optical receptors in the human eye (i.e., rods and cones) vary in responsiveness to received light. In some embodiments, the ambient light sensor 44 approximates this change in spectral response of the ordinary human eye. For instance, in low-light conditions within the scotopic range, the spectral response of the ambient light sensor 44 may instead be represented by curve 80. In such an instance, the peak response or sensitivity of the ambient light sensor during scotopic lighting levels may occur at a lower wavelength (represented by reference numeral 82) than during photopic lighting conditions. In some embodiments, this peak response may occur at a wavelength of approximately 500 nm (e.g., 507 nm) when the sensor 44 receives ambient light during photopic ambient lighting conditions.

Accordingly, the spectral response of the ambient light sensor 44 may be represented by the curve 76 for photopic ambient light levels and by curve 80 for scotopic ambient light levels. Additionally, the spectral response of the ambient light sensor 44 may vary between the photopic response and the scotopic response, as generally depicted the arrow 84. Such intermediate spectral responses for ambient light levels within the mesopic range (i.e., between the scotopic and photopic ranges) may be based on various set points in the mesopic range or may be interpolated from the spectral responses represented by the curve 76 and 80. As used herein, the term "photopic range" refers to a luminance level of three candelas per square meter or greater, the term "scotopic range" refers to luminance levels of three one-hundredths of a candela per square meter or lower, and the term "mesopic range" refers to luminance levels between the scotopic and photopic ranges. Additionally, it is noted that the spectral response of the ambient light sensor 44 may depend on both hardware components of the sensor 44, as well as associated software (which may, in some embodiments, be executed by a processor 18 separate from the sensor 44). Accordingly, variation of the spectral response of an ambient light sensor may be accomplished within the sensor 44, outside the sensor 44 (e.g., by a processor 18 that executes software to select a spectral response function and convert the detected ambient light radiance levels to luminance levels based on the selected function), or a combination of both.

Figure 7:
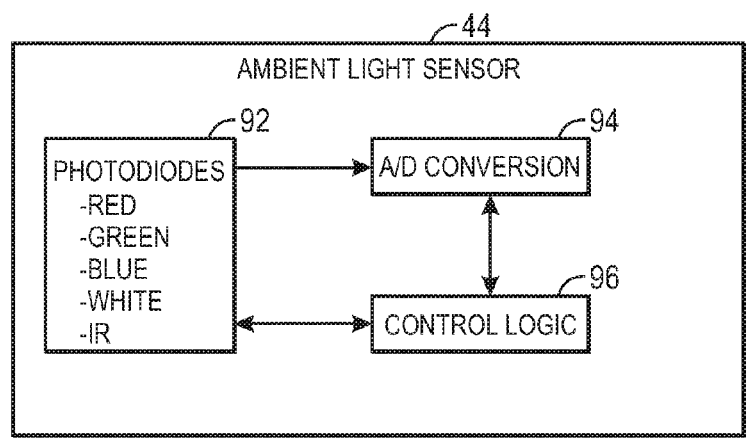
FIG. 7 is a block diagram depicting examples of components of an ambient light sensor in accordance with aspects of the present disclosure.

The ambient light sensor 44 may include various components, examples of which are generally depicted in FIG. 7. Although the present components are provided for explanatory purposes, it is noted that the present techniques may be used with any of various ambient light sensors that may differ in structure and components from that presently depicted in FIG. 7. With this in mind, in one embodiment the ambient light sensor 44 includes one or more photodiodes 92. The photodiodes are configured to receive photons of light and to generate an electrical signal representative of the received light. In presently illustrated embodiment, the photodiodes 92 include red, green, and blue photodiodes to measure the radiance of received red, green, and blue light, respectively. The photodiodes 92 may also include one or more white (or unfiltered) photodiodes adapted to measure ambient light across at least the visual spectrum. An infrared filter may be provided over the photodiodes 92 to prevent infrared radiation from interfering in the measurement of visible light, or one or more separate infrared photodiodes 92 may be provided and used to compensate for infrared radiation received by the other photodiodes (e.g., such as by reducing the outputs from the other photodiodes 92 by the infrared noise measured by an infrared photodiode). Although the presently depicted ambient light sensor includes an array of different photodiodes 92, in other embodiments a device 10 may include one or multiple ambient light sensors 44 having different subsets of these photodiodes 92 (e.g., one sensor 44 having red, green, and blue photodiodes 92 and another sensor 44 having white and red-infrared photodiodes 92).

In the presently illustrated embodiment, the ambient light sensor 44 also includes analog-to-digital conversion circuitry 94. Control logic 96 may also be provided to control various operational aspects of the ambient light sensor 44. Light received by the photodiodes 92 generates electrical signals representative of the ambient light, and these representative electrical signals may be converted by the analog-to-digital conversion circuitry for subsequent output to a processor or other controller. In other embodiments, the ambient light sensor 44 could output analog signals representative of the measured ambient light levels, and the analog-to-digital conversion circuitry 94 could be provided elsewhere in the device 10.

Figure 8:
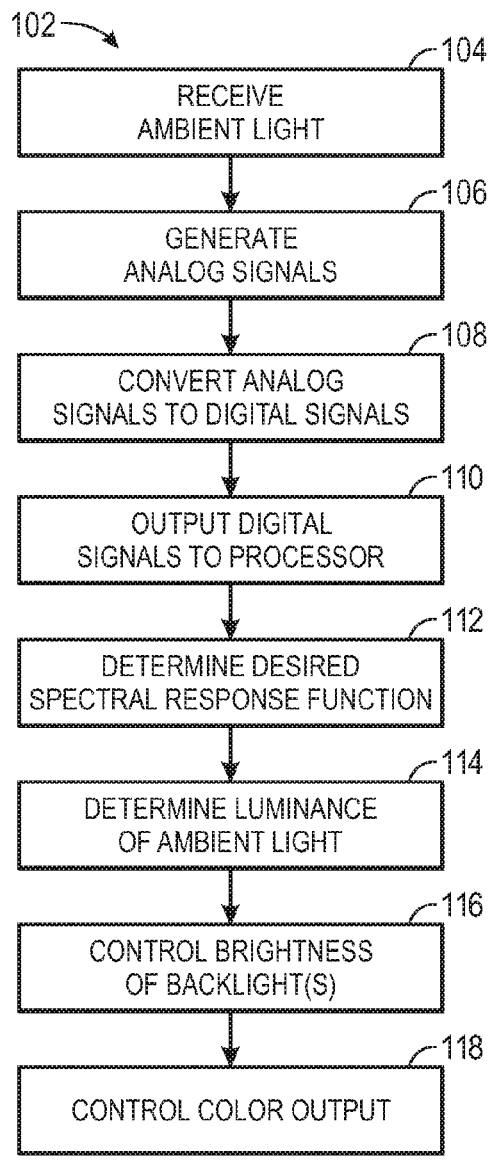
FIG. 8 is a flowchart representing a process for controlling aspects of a device based on ambient light levels measured by an ambient light sensor with a varying spectral response in accordance with aspects of the present disclosure.

Aspects of the device 10 may be controlled based on the received ambient light, such as in accordance with flowchart 102 depicted in FIG. 8. In this example, ambient light may be received by the ambient light sensor 44 at block 104, and receipt of such light may cause analog signals to be generated (e.g., via the photoelectric effect) at block 106. The analog signals may be converted to digital signals (e.g., by analog-to-digital conversion circuitry 94) at block 108, and output to a controller, such as a processor 18, at block 110. The signals output to the processor may generally represent the radiance of ambient light received by the ambient light sensor 44. The processor may then determine a desired spectral response function at block 112 and use the selected spectral response function to determine luminance of the ambient light at block 114. The determined luminance of the ambient light may, in turn, be used to control the brightness of one or more backlights (e.g., a display backlight, a keyboard backlight, or both) at block 116, to control color output from a display or a keyboard at block 118, or may be used to control other aspects of the device 10.

For example, if the ambient light sensor 44 detects high luminance levels, the device 10 may deactivate the keyboard backlight 54 but drive the display backlight 48 to a relatively high brightness level to make the display panel 46 easier to read by a user. At lower luminance levels detected by the ambient light sensor 44, the keyboard backlight 54 may be activated (to facilitate ease of use at lower light levels) and the display backlight 48 may be driven to a lower brightness level. The relative intensity of both backlights 48 and 54 may vary further in accordance with changes in ambient light levels.

Figure 9:
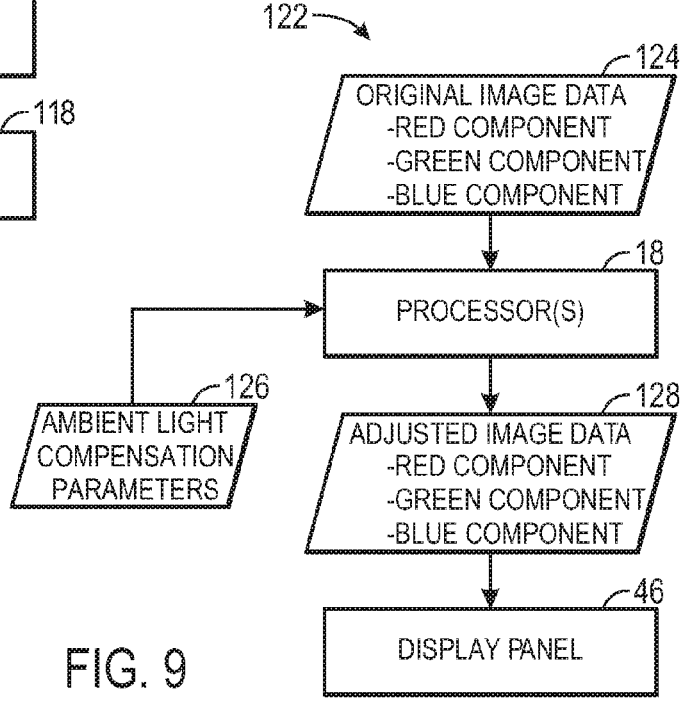
FIG. 9 generally illustrates the adjustment of colors to be output via a display based on ambient light compensation parameters in accordance with aspects of the present disclosure.

By way of further example, the color output of the display may also or instead be adjusted in view of ambient light levels in accordance with flowchart 122 depicted in FIG. 9. In this depicted embodiment, the electronic device 10 may be configured to display original image data 124 via the display panel 46. In certain lighting conditions, however, user perception of the colors that would be output via the display panel 46 in response to the original image data 124 may differ from that expected in other lighting conditions. For instance, the typical human eye undergoes dark adaptation when transitioning from photopic to sub-photopic light ranges, and light adaptation when transitioning from sub-photopic to photopic light ranges. Further, the typical human eye exhibits greater responsivity to blue light and less responsivity to red light when dark adapted to the scotopic range (or the mesopic range) than when light adapted to the photopic range. Consequently, the typical human eye essentially exhibits a shift in which the dark adapted eye perceives blue to be brighter and red to be dimmer than would be the case if the eye were adapted to normal light levels. This shift, also known as the Purkinje effect, may cause the perception of undesirable color error in a displayed image at low-light levels.

Consequently, returning to flowchart 122, ambient light compensation parameters 126 may be applied to adjust the original image data 124, producing adjusted image data 128. In one embodiment, such adjustment may include increasing red components of images and decreasing blue components in such images during low-light conditions to compensate for the perceived color shift due resulting from changing spectral response of the typical human eye. The adjusted image data 128 may then be output via the display panel 46.

Figure 10:
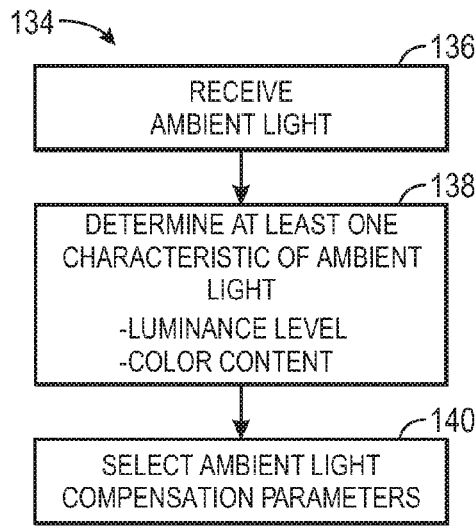
FIG. 10 is a flowchart indicative of a process for selecting the ambient light compensation parameters of FIG. 9 in accordance with aspects of the present disclosure.

The ambient light compensation parameters 126 may generally be determined in accordance with flowchart 134, which is depicted in FIG. 10 by way of example. Particularly, ambient light may be received by the ambient light sensor 44 at block 136. The device 10 (e.g., via ambient light sensor 44, processor 18, or both) may determine one or more characteristics of the received ambient light at block 138. For example, in various embodiments, the luminance level or color content of the ambient light may be determined. Based on the determined characteristics, ambient light compensation parameters 126 may be selected at block 140. As generally discussed above, in one embodiment the ambient light compensation parameters 126 may include a set of compensation parameters for increasing a red component of image data to be displayed, reducing a blue component of image data to be displayed, or both, to compensate for the perceived color shift in the spectral response of the typical human eye at sub-photopic light levels. In other embodiments, color compensation parameters may also include parameters for increasing or decreasing a green color component to also compensate for the variation in the spectral response of the human eye. Additionally, as the spectral response of the human eye varies between photopic response and scotopic response within the mesopic range, the device 10 may include (or determine) multiple sets of compensation parameters that may be selected for different luminance levels to enable the amount of compensation applied to the image data to be more closely correlated to the extent of deviation of the ambient light levels from a photopic range.

Figure 11:
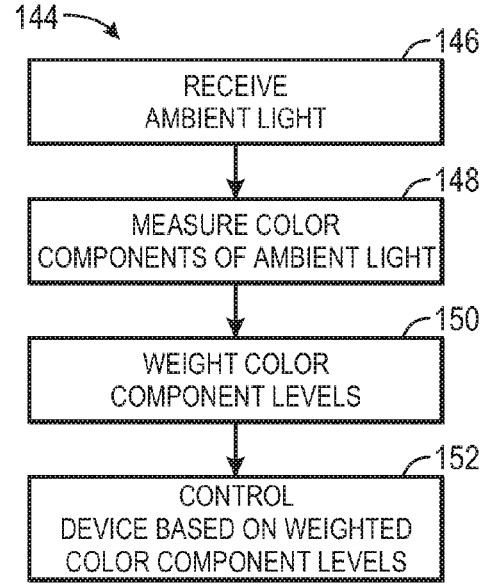
FIGS. 11 and 12 are flowcharts of methods for controlling a device based on weighted color component levels in accordance with aspects of the present disclosure.

The device 10 may also control various operational aspects based on weighted color component levels of the ambient light, as generally represented by flowchart 144 of FIG. 11, which is provided in accordance with one embodiment. Particularly, ambient light may be received at block 146 and various color component intensity (e.g., radiance or luminance) levels may be measured at block 148. For example, in some embodiments, the color components may include a red color component, green color component, and a blue color component. The color component levels measured at block 148 may then be weighted at block 150 based on desired weighting factors. The device may then be controlled based on the weighted color component intensity levels at block 152.

As previously noted, such control of the device at block 152 may include, among other things, controlling the intensity level of one or more device backlights or adjusting the color output of a display or a keyboard. For example, if the weighted color component levels indicate that the ambient lighting is predominantly one color (e.g., blue), the display or keyboard may be controlled to either more closely match the color content of the ambient light (e.g., by increasing the blue content of the light output from the keyboard or display) or further distinguish the light from the display or the keyboard from the ambient light (e.g., by decreasing the blue content of the light output from the keyboard or display). Indeed, in some embodiments using an ambient light sensor 44 including a white photodiode and a red-infrared photodiode (rather than, for example, separate red, green, and blue photodiodes), the white and red-infrared photodiodes may be used (e.g., by comparing ratios of white light to red-infrared light) to detect certain shifts in ambient lighting, such as detecting a change from fluorescent lighting to incandescent lighting, or detecting some other color shift. Based on this perceived color shift, the backlight intensities or color characteristics of light output by the display or keyboard may be adjusted.

Figure 12:
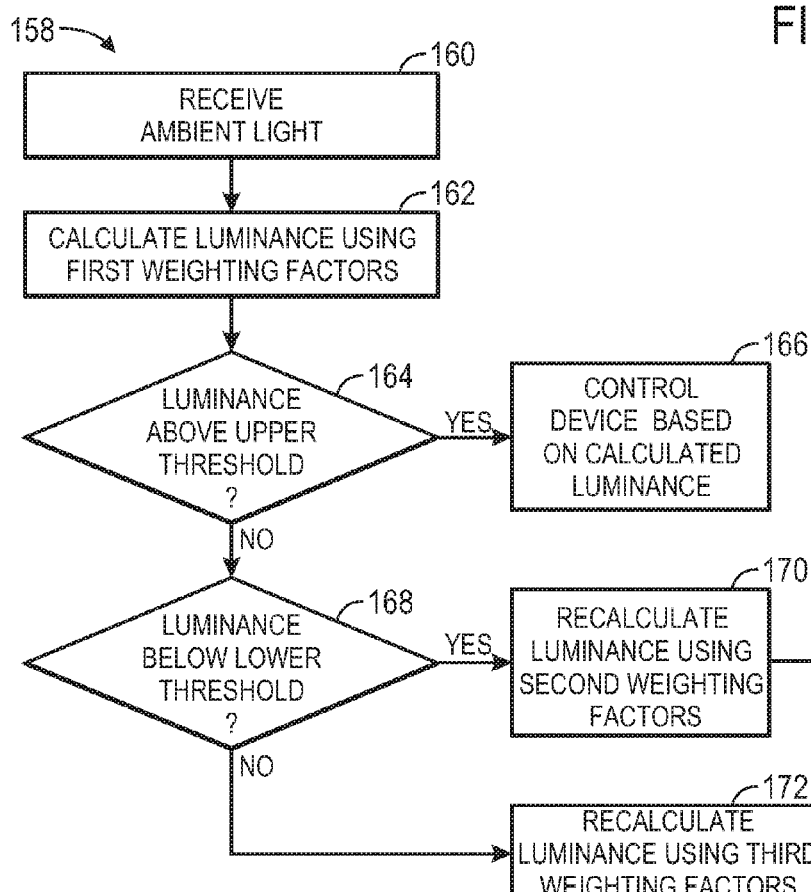

A more detailed example of such weighting is provided in the form of a flowchart 158, which is provided in FIG. 12 in accordance with one embodiment. As depicted by the flowchart 158, ambient light may be received at block 160 and the luminance of the ambient light may be calculated using a first set of weighting factors at block 162. In one embodiment, the first set of weighting factors may be associated with a photopic luminance range. For instance, the first set of weighting factors may include weighting factors for various color components (e.g., red, green, and blue) based on the desired photopic response of the ambient light sensor 44 (see, e.g., curve 76 of FIG. 6), and the luminance of the ambient light may be calculated based on the radiance of the individual color components of the ambient light weighted with the respective weighting factors of the first set.

The calculated luminance may be compared to an upper threshold at decision block 164. If the calculated luminance is greater than the upper threshold, aspects of the device, such as backlight intensities or color output, may be controlled based on the calculated luminance at block 166. If the luminance calculated at block 162 does not exceed the upper threshold, the calculated luminance may then be compared to a lower luminance threshold at decision block 168. If the luminance calculated at block 162 is below the lower threshold, the luminance of the ambient light may be recalculated using a second set of weighting factors at block 170.

In one embodiment the upper threshold may be set to the lower bound of the photopic range and the lower threshold may be set to the upper bound of the scotopic range. In such an embodiment, the first set of weighting factors may generally be associated with photopic illumination (i.e., weighting factors to be used when ambient light is within the photopic range) and the second set of weighting factors may be associated with the scotopic illumination levels (e.g., the second set of weighting factors may be based on desired scotopic response, such as that represented by curve 80 of FIG. 6). If the luminance calculated at block 162 does not exceed the upper threshold, but is at or above the lower threshold, the luminance may be recalculated using a third set of weighting factors at block 172. The third set of weighting factors may be associated with the mesopic range in some embodiments, and may be determined in any suitable manner, such as from a look-up table or interpolated from the other weighting factors. In those cases in which the luminance has been recalculated in blocks 170 or 172, the device 10 may then controlled at block 174 based on the recalculated luminance.

Figure 13:
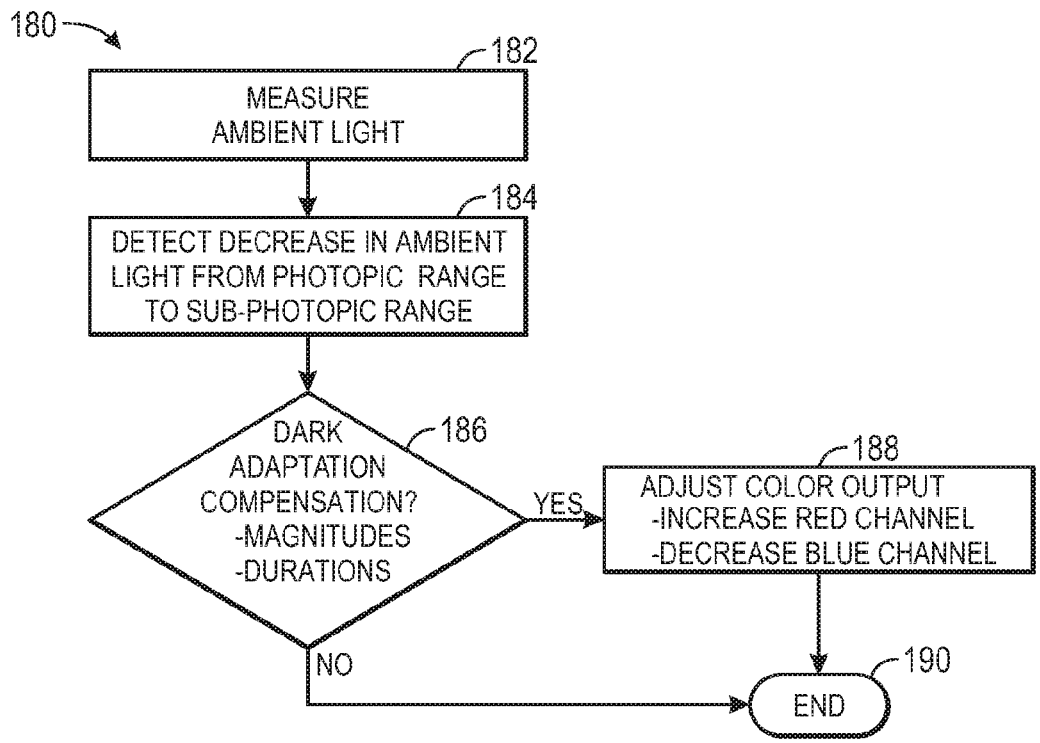
FIGS. 13 and 14 are flowcharts representative of methods for varying color output of a display to compensate for dark adaptation and light adaptation in accordance with aspects of the present disclosure.

Additionally, the electronic device 10 of some embodiments may be configured to gradually compensate for dark adaptation and light adaptation by the human eye to compensate for (i.e., to reduce or illuminate) perceived color shifts in visual output by the display panel 46. In accordance with one embodiment represented by flowchart 180 in FIG. 13, ambient light may be measured at block 182 and the device 10 may detect a decrease in ambient light levels from a photopic range to a sub-photopic range (i.e., the mesopic range or the scotopic range) at block 184. The device 10 may then determine whether to apply dark adaptation compensation at decision block 186.

The decision whether to apply dark adaptation compensation may depend on the magnitude of the decrease in ambient light levels, the magnitude of the ambient light levels before and after the decrease in level, the duration of the decrease (e.g., whether the decrease was sudden or more gradual), the duration of time in which ambient light levels were within the photopic range before decreasing into a sub-photopic range (indicative of whether a human eye was fully light adapted), or the like. If the device 10 determines that dark adaptation compensation is desired, the device 10 may adjust the display output at block 188. For example, the device 10 may adjust aspects of the image data to be displayed, such as in the manner described above with respect to flowchart 122 (e.g., by increasing intensities of red components of image data and reducing intensities of blue components of the image data).

Additionally, in at least some embodiments, the dark adaptation compensation may be applied in a gradual manner to better approximate the physiological shift from light adaptation to dark adaptation in the typical human eye based on the change in ambient light levels. For instance, the red component of image data may be gradually increased and the blue component of the image data may be gradually decreased over a desired time period (e.g., 30 seconds, one minute, three minutes, five minutes, or ten minutes). Any desired time period may be selected, though in some embodiments the time period may be determined based on one or more of the factors noted above with respect to determining whether to apply dark level compensation (e.g., the magnitude of the decrease in ambient light levels or the duration of time in which the ambient light levels had been within the photopic range) to better approximate the change in the spectral response of the typical human eye in response to the change in the ambient light level.

Still further, the decision on whether to gradually apply dark level compensation may be based on a determination that the magnitude of the change in ambient light levels exceeds a certain amount within a time period, such as decreasing by at least one-quarter or one-half in less than one minute, or decreasing by at least ninety percent, ninety-five percent, or ninety-nine percent over another time period (e.g., in less than one second, three seconds, five seconds, ten seconds, twenty seconds, or thirty seconds). The flowchart 180 is depicted as ending at block 190 after applying dark adaptation compensation at block 188 or after determining not to apply dark adaptation compensation.

Figure 14:
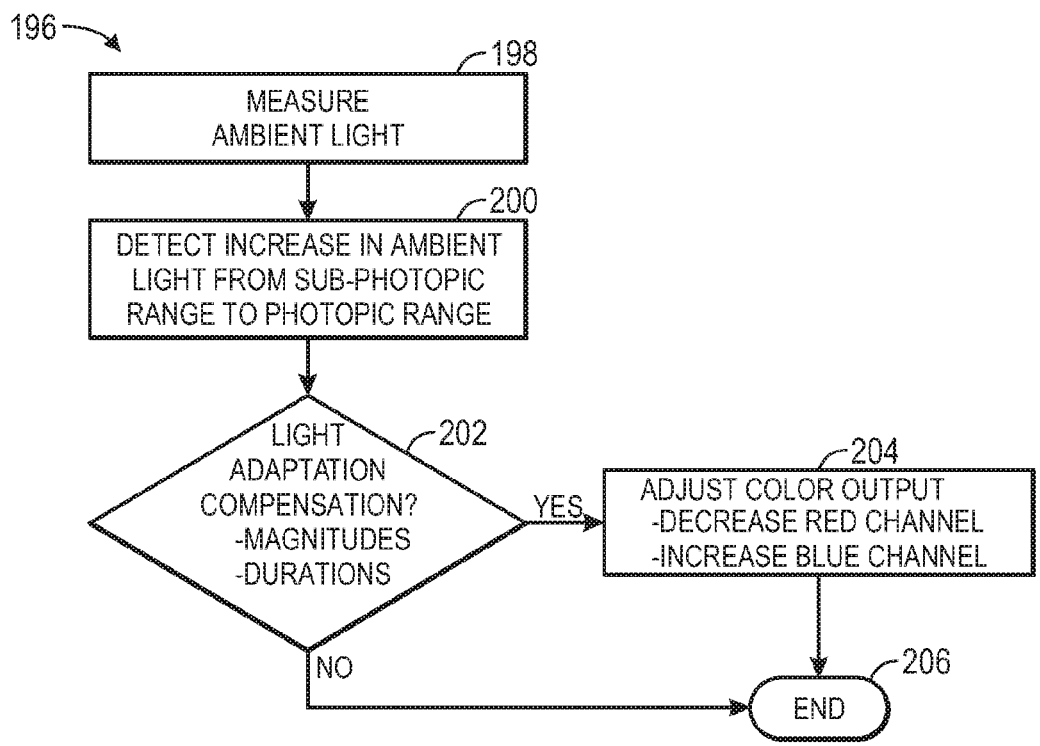

In flowchart 196 of FIG. 14, ambient light may be measured at block 198 and an increase in the ambient light levels from a sub-photopic range to a photopic range may be detected at block 200. The device 10 may determine whether to apply light adaptation compensation at decision block 202. Similarly, the decision whether to apply light adaptation compensation may depend on the magnitude of the increase in ambient light levels, the magnitude of the ambient light levels before and after the increase in level, the duration of the increase, the duration of time in which ambient light levels were within a sub-photopic range before increasing into the photopic range, and so forth. If such compensation is desired, the device 10 may adjust the display color output at block 204. For example, in one embodiment, the display color output adjustments may be generally opposite those of block 188 of flowchart 180. Such adjustments may also be applied gradually (e.g., based on factors generally similar to those described above with respect to dark adaptation compensation) to better approximate the change in spectral response of the typical human eye during the light adaptation process. Because the human eye adapts to photopic light levels faster than it adapts to sub-photopic light levels, the time period in which light adaptation compensation is applied may be less than the time period in which dark adaptation compensation is applied in at least some embodiments. The illustrated flowchart 196 concludes at block 206 following light adaptation compensation at block 204 or after determining not to apply light adaptation compensation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device, comprising:
a display including a first backlight;
a keyboard illuminated by a second backlight; and
an ambient light sensor configured to detect ambient light levels and to operate in accordance with a spectral response function that varies based on the detected ambient light levels such that the spectral response function comprises a first peak response of the ambient light sensor that occurs at a first wavelength for a first ambient light level and a second peak response that occurs at a second wavelength different from the first wavelength for a second ambient light level lower than the first ambient light level;
wherein the brightness of the first and second backlights is controlled based on output from the ambient light sensor and on the variation of the spectral response function of the ambient light sensor.

2. The electronic device of claim 1, wherein variation of the spectral response function of the ambient light sensor in response to changing ambient light levels approximates variation in the spectral response function of a human eye in response to the changing ambient light levels.

3. The electronic device of claim 1, wherein the first ambient light level is greater than three candelas per square meter and the second ambient light level is less than three candelas per square meter.

4. The electronic device of claim 3, wherein the second ambient light level is less than three one-hundredths of a candela per square meter.

5. The electronic device of claim 1, wherein the electronic device is configured such that colors output via the display are varied based on the variation of the spectral response function of the ambient light sensor.

6. The electronic device of claim 1, wherein the electronic device is configured to detect color content of ambient light via the ambient light sensor and to vary colors output via the display based on the detected color content.

7. The electronic device of claim 1, wherein the spectral response function comprises a first spectral response function and a second spectral response function, and wherein the first spectral response function is associated with a photopic luminance range and the second spectral response function is associated with a scotopic luminance range.

8. A method comprising:
receiving light at an ambient light sensor;
measuring intensity levels of different components of the received light;
generating a first set of weighted measured intensity levels of the different components using the measured intensity levels and a first set of weighting factors, wherein the first set of weighting factors is associated with a photopic luminance range;

calculating a first luminance of the first set of weighted measured intensity levels; and controlling the brightness level of a light source based on the first luminance when the first luminance is above an upper threshold value.

9. The method of claim 8, wherein measuring the intensity levels of the different components of the received light comprises measuring the intensity levels of different color components of the received light, and wherein generating the first set of weighted measured intensity levels of the different components includes generating the first set of weighted measured intensity levels of the different color components.

10. The method of claim 9, wherein the different color components include red, green, and blue color components, wherein the first set of weighting factors comprise a first set of red, green, and blue weighting factors associated with the photopic luminance range.

11. The method of claim 8, comprising generating a second set of weighted measured intensity levels of the different components using the measured intensity levels and a second set of weighting factors when the first luminance value is below a lower threshold value, wherein the second set of weighting factors is associated with a scotopic luminance range;

calculating a second luminance of the second set of weighted measured intensity levels; and controlling the brightness level of the light source based on the second luminance when the first luminance is below the lower threshold value.

12. The method of claim 11, comprising generating a third set of weighted measured intensity levels of the different components using the measured intensity levels and a third set of weighting factors when the first luminance value is equal to or exceeds the lower threshold value and does not exceed the upper threshold, wherein the third set of weighting factors is associated with a mesopic luminance range;

calculating a third luminance of the third set of weighted measured intensity levels; and controlling the brightness level of the light source based on the third luminance when the first luminance is equal to or exceeds the lower threshold value and does not exceed the upper threshold.

13. The method of claim 10, wherein the first set of weighted measured intensity levels is generated based on an additional set of red, green, and blue weighting factors upon detection that the first luminance is above the upper threshold value.

14. The method of claim 8, wherein measuring the intensity levels of the different components of the received light includes measuring the intensity levels of white light received by the ambient light sensor and of red and infrared light received by the ambient light sensor.

15. A system comprising:

a display panel;

an ambient light sensor configured to receive ambient light and to operate in accordance with a spectral response function that varies based on the received ambient light such that a first peak response of the ambient light sensor occurs at a first wavelength for a first ambient light level and a second peak response occurs at a second wavelength different from the first wavelength for a second ambient light level lower than the first ambient light level; and a processor configured to provide image data to be displayed by the display panel;

wherein the system is configured to alter color output of the display panel based on at least one characteristic of the received ambient light, wherein the at least one characteristic of the received ambient light comprises a variation of the spectral response function of the ambient light sensor.

16. The system of claim 15, wherein the display panel includes red pixels, green pixels, and blue pixels.

17. The system of claim 16, wherein the at least one characteristic of the received ambient light includes a measured ambient light luminance level, and the system is configured to increase a red color component of the image data to be displayed by the display panel based on detection that the measured ambient light luminance level is below a luminance threshold.

18. The system of claim 17, wherein the system is configured to gradually increase the red color component of the image data to be displayed by the display panel over a time period of at least thirty seconds when the measured ambient light luminance level is below the luminance threshold.

19. The system of claim 16, wherein the at least one characteristic of the received ambient light includes a measured ambient light luminance level, and the system is configured to decrease a blue color component of the image data to be displayed by the display panel when the measured ambient light luminance level is below a luminance threshold.

20. The system of claim 16, wherein the at least one characteristic of the received ambient light includes a measured ambient light luminance level, and the system is configured to increase or decrease a green color component of the image data to be displayed by the display panel when the measured ambient light luminance level is below a luminance threshold.

21. The system of claim 15, wherein the at least one characteristic of the received ambient light includes color content of the received ambient light.

* * * * *